United States Patent [19]

Nakano et al.

[11] 4,174,311

[45] Nov. 13, 1979

[54] HARDENABLE COMPOSITION CONTAINING DIISOPROPYLBENZENE DIHYDROPEROXIDE

[75] Inventors: Tatsuo Nakano; Shozo Hori; Ikuji Kishi, all of Machida, Japan

[73] Assignee: Denki Kagaku Kogyo Kabushiki Kaisha, Tokyo, Japan

[21] Appl. No.: 863,049

[22] Filed: Dec. 21, 1977

[30] Foreign Application Priority Data

Feb. 22, 1977 [JP] Japan .................................. 52-18478

[51] Int. Cl.$^2$ .......................... C08F 4/34; C08F 18/00; C08F 20/00; C08L 91/00
[52] U.S. Cl. .......................... 260/28.5 R; 260/28.5 A; 260/28.5 B; 260/28.5 D; 526/217; 526/222; 526/230; 526/273; 526/292; 526/301; 526/313; 526/320; 526/328; 526/329.1; 526/329.7
[58] Field of Search ............... 526/200, 230, 273, 292, 526/328, 320, 329.1, 329.7, 301, 313; 260/28.5 B, 28.5 R, 879, 878, 880 R

[56] References Cited

U.S. PATENT DOCUMENTS

| | | | |
|---|---|---|---|
| 2,232,515 | 2/1941 | Arnold et al. | 526/201 |
| 2,626,968 | 1/1953 | Newell | 260/28.5 B |
| 2,638,460 | 5/1953 | Crouch | 260/28.5 B |
| 2,649,425 | 8/1953 | Hulse | 260/28.5 B |
| 2,950,270 | 8/1960 | Chapin et al. | 526/329.1 |
| 3,137,681 | 6/1964 | Orr | 526/329.1 |
| 3,851,017 | 11/1974 | Werber | 260/897 B |
| 3,853,827 | 12/1974 | Klatil | 526/230 |
| 3,970,505 | 7/1976 | Hauser et al. | 526/217 |
| 4,052,547 | 10/1977 | Foley et al. | 526/228 |

FOREIGN PATENT DOCUMENTS

| | | | |
|---|---|---|---|
| 563899 | 9/1958 | Canada | 526/93 |
| 913590 | 12/1962 | United Kingdom | 526/207 |

Primary Examiner—Herbert J. Lilling
Attorney, Agent, or Firm—Oblon, Fisher, Spivak, McClelland & Maier

[57] ABSTRACT

A hardenable composition comprises (1) an acrylate and/or methacrylate monomer; (2) diisopropylbenzene dihydroperoxide as a hardener and a hardening accelerator.

9 Claims, No Drawings

HARDENABLE COMPOSITION CONTAINING DIISOPROPYLBENZENE DIHYDROPEROXIDE

BACKGROUND OF THE INVENTION

1. Field of the Invention

The present invention relates to a hardenable composition which comprises an acrylate and/or methacrylate monomer (hereinafter referring to as (metha)acrylate monomer), a hardener and a hardening accelerator.

2. Description of the Prior Art

It has been known that the hardenable compositions comprising the (metha)acrylate monomer, a hardener and a hardening accelerator are useful for liquid sealants, adhesive compositions and paints.

These hardenable compositions were disclosed in U.S. Pat. No. 2,895,950 Japanese Patent Publication No. 3595/1963 and Japanese Unexamined Patent Publication Nos. 33234/1975; 64326/1975 and 129632/1975. The hardeners in the compositions are catalysts for polymerizing the (metha)acrylate monomer and various organic peroxides or hydroperoxide have been used as the hardener.

It is optimum to select a catalyst having fast hardening rate i.e. catalyst imparting fast polymerization rate. Among known hardeners, benzoyl peroxide and cumene hydroperoxide are preferably used. However, it is not suitable to use a hardener which decomposes in a storage to form radicals and to polymerize the (metha)acrylate monomer in the contact with the (metha)acrylate monomer even though it imparts fast polymerization rate. For example, benzoyl peroxide easily decomposes to form radicals when it is stored or placed in a hot condition, whereby the storage stability is too low in the case of the mixture of benzoyl peroxide and (metha)acrylate monomer.

When the (metha)acrylate monomer is polymerized with benzoyl peroxide, the impact strength of the hardened product is relatively low and local hardening is caused and it is not suitable for bonding broad area. When benzoyl peroxide is contacted with a skin, skin inflammation is caused.

When cumene hydroperoxide is mixed with the (metha)acrylate monomer, it is relatively stable in storage whereby the hardening is not easily caused and the hardening is initiated by adding a hardening accelerator. However, cumene hydroperoxide causes bad smell, skin diseases and respiratory organ diseases by breathing. Accordingly, it has been required to find an improved hardener from the environmental pollution and hygiene.

Summary of the Invention

It is an object of the present invention to provide a hardenable composition which has high storage stability and no toxicity and no bad smell.

It is another object of the present invention to provide a hardenable composition which produces a hardened product having high bond strength and high hardening rate.

The foregoing objects of the present invention have been attained by providing a hardenable composition which ccomprises (1) acrylate and/or methacrylate (2) diisopropylbenzene dihyroperoxide as a hardener and a hardening accelerator.

Detailed Description of the Preferred Embodiments

The diisopropylbenzene dihydroperoxide has two hydroperoxyisopropyl groups having the formula

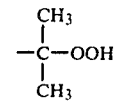

on meta- or para- positions of benzene ring.

In the present invention, meta- type or para- type or a mixture thereof can be used. The diisopropylbenzene dihydroperoxide has no smell and substantially no toxicity for skin contact. Even though the diisopropylbenzene is added to the (metha)acrylate monomer, excellent storage stability is kept, however when the hardening accelerator is added, it is rapidly hardened.

The amount of diisopropylbenzene dihydroperoxide for hardening is more than 0.5 wt. part and preferably 1 to 10 wt. parts per 100 wt. parts of total monomers. Even though more than 15 wt. parts of diisopropylbenzene dihydroperoxide is added, there is substantially no additional advantage.

It is the advantage of the composition of the present invention to use diisopropylbenzene dihydroperoxide as the hardener. It is possible to add a small amount of the other hardener.

The monomers used in the composition of the present invention are acrylate and/or methacrylate.

Suitable acrylates and methacrylates include alkyl acrylates such as methyl acrylate, ethyl acrylate, propyl acrylate, butyl acrylate, hexyl acrylate and lauryl acrylate; alkyl methacrylates such as methyl methacrylate, ethyl methacrylate, propyl methacrylate, butyl methacrylate and lauryl methacrylate; glycidyl acrylate, glycidyl methacrylate; hydroxyalkyl acrylates such as 2-hydroxyethyl acrylate, 2-hydroxypropyl acrylate, 3-chloro-2-hydroxypropyl acrylate; and hydroxyalkyl methacrylates such as 2-hydroxyethyl methacrylate, 2-hydroxypropyl methacrylate and 3-chloro-2-hydroxypropyl methacrylate; polyethyleneglycol mono (metha)acrylates having the formula

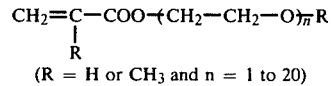

(R = H or CH$_3$ and n = 1 to 20)

propyleneglycol mono (metha)acrylates having the formula

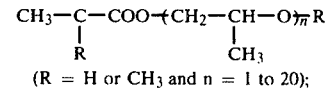

(R = H or CH$_3$ and n = 1 to 20);

mono or polyethyleneglycol diacrylates such as ethyleneglycol diacrylate, diethyleneglycol diacrylate, triethyleneglycol diacrylate and tetrathyleneglycol diacrylate; mono- or polyethyleneglycol methacrylates such as ethyleneglycol dimethacrylate, diethyleneglycol dimethacrylate, triethyleneglycol dimethacrylate and tetraethyleneglycol dimethacrylate; mono- or polypropyleneglycol diacrylates such as propyleneglycol diacrylate and tripropyleneglycol diacrylate; mono- or polypropyleneglycol dimethacrylates such as propyleneglycol dimethacrylate and tripropyleneglycol dimethacrylate; polyacrylates such as trimethylolpropane triacrylate, trimethylolethane triacrylate, and tetramethylolmethane tetraacrylate; polymethacrylates such as trimethylolpropane trimethacrylate, trimethylolethane trimethacrylate and tetramethylolmethane tetramethacrylate; polyester acrylates obtained by reacting acrylic acid and a glycol with a polybasic acid; polyester methacrylates obtained by reacting methacrylic acid and a glycol with a polybasic acid; epoxyacrylates obtained by reacting an epoxy compound with acrylic acid; epoxymethacrylates obtained by reacting an epoxy compound with methacrylic acid; amide acrylates obtained by reacting a polybasic acid with an amino alcohol and then reacting the product with acrylic acid; amide methacrylates obtained by reacting a polybasic acid with an aminoalcohol and then reacting the product with methacrylic acid; urethane acrylates obtained by reacting a hydroxyalkyl acrylate with a polyisocyanate; urethane methacrylates obtained by reacting a hydroxyalkyl methacrylate with a polyisocyanate; reactive oligomers of modified liquid NBR, liquid SBR, liquid polybutadiene, liquid 1,2-polybutadiene or liquid polychloroprene whose one or both of terminal is modified to acrylate or methacrylate. A mixture of the (metha)acrylate monomers can be used.

It is also possible to add the other vinyl comonomer such as styrene, α-methyl styrene, vinyl acetate, binyl propionate, acrylic acid amide, methacrylic acid amide, maleic acid, maleic anhydride, fumalic acid, chlorostyrene, acrylonitrile, methacrylonitrile, acrylic acid and methacrylic acid. An amount of the other vinyl comonomer should be less than 50 wt. % to the (metha)acrylate monomer. When the amount of the other vinyl monomer is too much, the characteristics of the composition of the present invention may be inferior.

The hardening accelerators are to accelerate the decomposition of diisopropylbenzene dihydroperoxide and are the reduction components of the redox catalysts.

Suitable hardening accelerators include thioamides such as thiourea, acetyl thiourea, tetramethyl thiourea, diethyl thiourea, dibutyl thiourea, ethylene thiourea, trimethyl thiourea, diphenyl thiourea, ditolyl thiourea and mercaptobenzimidazol; tertiary amines such as diethyl-p-toluidine, dimethyl-p-toluidine, diisopropanol-p-toluidine, triethyl amine, tripropyl amine, ethyl diethanol amine, N,N-dimethyl aniline; quaternary ammonium salts such as tetramethyl ammonium chloride and tetraethyl ammonium chloride; oximes such as methylisobutyl ketoxime, methylethyl ketoxime, acetophenone oxime; thioethers such as 2,2'-thiodiethanol, 2,2'-thiodipropionitrile; organic chlorosulfonyl compounds such as methylchlorosulfite, n-propylchlorosulfite, and phenylchlorosulfite; trichloroacetate; organic metal salts such as acetyl acetonates and naphthenates of Cu, Ti, Co, Mn, V, Cr or Fe.

One or more hardening accelerators can be used. It is possible to use an adjuvant for the hardening accelerator such as orthosulfobenzimide and benzyl chloride.

The amount of the hardening accelerator is more than 0.01 wt. part preferably 0.01 to 15 wt. parts especially 0.1 to 10 wt. parts per 100 wt. parts of total monomers.

The composition of the present invention comprises the (metha) acrylate monomer, the hardener and a hardening accelerator.

In order to further improve the characteristics of the hardenable composition, it is possible to add the other additive. For example, it is possible to dissolve or disperse various polymers or plasticizers or various inorganic or organic powders in the composition in order to adjust a viscosity or to modify the hardened product.

It is effective for improving adhesive characteristics especially an impact strength and a peeling strength to add NBR, SBR, styrenebutadiene block copolymers, polychloroprenes, polybutadienes, carboxylated polymers, polyethylene chlorosulfonate thereof; and graft polymers having components of butadiene with at least one of acrylonitrile, styrene and methyl methacrylate. It is possible to add paraffin wax in the composition.

In order to prevent the polymerization of the (metha)acrylate in the storage, it is preferable to add a conventional polymerization inhibitor.

Suitable polymerization inhibitors include methyl hydroquinone, hydroquinone, catechol, hydroquinone monomethyl ether, mono tartiarybutyl hydroquinone, 2,5-ditertiarybutyl hydroquinone, p-benzoquinone, 2,5-diphenyl-p-benzoquinone, 2,5-ditertiarybutyl hydroquinone, p-benzoquinone, 2,5-diphenyl-p-benzoquinone, 2,5-ditertiarybutyl picric acid, phenothiazine, tertiarybutyl catechol, 2-butyl-4-hydroxyanisole and 2,6-ditertiarybutyl-p-cresol.

When any hardening accelerator is not included, even though the (metha)acrylate is admixed with the hardener, the mixture is stable for a long time without hardening.

The compositions of the present invention are suitable as sealing compositions, adhesive compositions and paints.

The compositions of the present invention have substantially no tendency for hardening in the storage, and have fast hardening rate and no bad smell and substantially no tendency for causing skin reaction and the hardened products have excellent impact strength and adhesive strength.

In one embodiment of the compositions of the present invention, the compositions can be used as one solution type anaerobic composition. That is, the composition of the invention comprising three components is contacted with air in the storage and is hardened by air-tightening in the hardening step.

In the other embodiment of the composition of the present invention, the composition is used as two solution type composition. That is, the hardener can be stored with or without mixing with (metha) acrylate optionally the other vinyl monomer and the other additives but it can not be stored with the hardening accelerator. The hardening accelerator can be stored with or without mixing with (metha)acrylate or the other monomer. The hardener and the hardening accelerator should be mixed in the hardening step. If necessary, the other vinyl monomer and the other additive can be admixed in the hardening step.

One of the hardener and the hardening accelerator can be dissolved or dispersed in a solvent in the former case.

The invention will be further illustrated by certain examples and references. The terms of part and percentage respectively mean part by weight and percentage by weight.

The physical properties were measured by the following methods.

1. Bond strength

Test piece: Two sheets of cold rolled steel plates whose surfaces were blasted by sand (150 mesh) and degreased with acetone, were bonded.

Tensile strength: ASTM D1002-64
Impact strength: ASTM D950-54
Peeling strength: ASTM 1876-6T

2. Set time

The composition of the invention or the reference was applied on a smooth surface of steel or stainless steel plate (25.4 mm×100 mm) and the other steel or stainless steel plate was superposed on the applied plate at room temp. 20° C. and the time needed for non-movement by finger touch was measured.

3. Storage stability

A 10$^{cc}$ of the composition of monomers, a hardener and optionally a hardening accelerator was charged in a glass tube (volume of 50$^{cc}$ and length of 15$^{cm}$) and heated in a bath at constant temperature and the time needed for gelation of the composition was measured.

EXAMPLE 1

In a 3 liter separable flask, 840 g of methyl methacrylate, 840 g of 2-hydroxyethyl methacrylate, 6 g of paraffin wax having a melting point of 56° C. and 320 g of NBR (Trade name of Nippol 1072) were charged and stirred for two days to prepare uniform mixture.

The compositions A were respectively prepared by admixing 100 wt. parts of the mixture with 0.5 wt. part of hydroquinone (polymerization inhibitor) and the specific amount of a hardener of an organic peroxide shown in Table 1. The amounts of the hardeners of the peroxides used in References A-2 to A-6 are substantially equivalent to active oxygen content corresponding to 6 wt. parts of diisopropylbenzene dihydroperoxide.

The compositions B were respectively prepared by admixing 100 wt. parts of the mixture with 1.0 wt. part of ethylene thiourea, or dimethyl paratoluidine (hardening accelerator).

The composition A and the composition B at a ratio of 1:1 by weight were applied on cold rolled steel test pieces and the bond strength of the sample was measured. The results are shown in Table 1.

When 2,5-dimethyl hexane-2,5-dihydroperoxide which is one of dihydroperoxides was used, the hardening was not completed after one day from the adhesion.

When t-butyl hydroperoxide or p-methane hydroperoxide was used, the hardening was resulted after 8 to 9 minutes however, the bond strength was low.

When diisopropylbenzene dihydroperoxide was used, the hardening ration was fast and the bond strength was high whereas the bond strength was lower in the case of benzoyl peroxide and the hardening ratio (set time) was slower in the case of cumene hydroperoxide. The adhesive composition having short set time is especially advantageous in a continuous line of mass production.

Table 1

| Test | Composition A No. | Hardener | Composition B No. | Hardening accelerator | Tensile strength (Kg/cm²) | Impact strength (Kg . cm/cm²) | Peel strength (Kg/25mm) | Set time |
|---|---|---|---|---|---|---|---|---|
| 1 | A-1 | DHP:6.0 | B-1 | N-22:1.0 | 300 | 20 | 10.1 | 3 min. |
| 2 | A-2 | CHP:8.8 | B-1 | " | 313 | 21 | 10.4 | 6 min. 30 sec. |
| 3 | A-3 | DMH:4.0 | B-1 | " | — | — | — | No hardening |
| 4 | A-4 | BHP:4.8 | B-1 | " | 65 | — | — | 8 min. |
| 5 | A-5 | MHP:10.0 | B-1 | " | 125 | — | — | 9 min. |
| 6 | A-6 | BPO:5.0 | B-2 | DMP:1.0 | 260 | 4.5 | 1.1 | 4 min. |
| 7 | A-7 | DHP:2.0 | B-1 | N-22:1.0 | 232 | 18 | 10 | 6 min. 30 sec. |
| 8 | A-8 | DHP:4.0 | B-1 | " | 280 | 17 | 10 | 5 min. 20 sec. |
| 9 | A-9 | CHP:3.0 | B-1 | " | 260 | 17 | 9.5 | 9 min. |
| 10 | A-10 | CHP:6.0 | B-1 | " | 276 | 18 | 9.5 | 7 min. 45 sec. |

Note:
(1) Test Nos 2 to 6 and 9 to 10 are References
(2) The symbols in the columns of the hardeners and the hardening accelerators designate the follows.
DHP: mixture of 80% of 1,4-diisopropylbenzene dihydroperoxide and 20% of 1,3-diisopropyl benzene dihydroperoxide. (purity of 80%)
CHP: cumene hydroperoxide (purity of 73%)
DMH: 2,5-dimethyl hexane-2,5-dihydroperoxide
BHP: t-butyl hydroperoxide (purity of 80%)
MHP: n-menthane hydroperoxide (purity of 50%)
BPO: benzoyl peroxide
N-22: ethylene thiourea
DMP: dimethyl paratoluidine

EXAMPLE 2

The compositions B were respectively prepared by admixing the components shown in Table 2.

The adhesive compositions were respectively prepared by combining the resulting composition B and the composition A-1 or A-2 at a ratio of 1:1 by weight and the physical properties of the adhesive compositions were tested. The bond strength was measured after 1 days from the bonding. The results are shown in Table 3.

Table 2

| Ingredient | Composition B | | | |
|---|---|---|---|---|
| | B-3 | B-4 | B-5 | B-6 |
| methyl methacrylate | 42 | 42 | 12.5 | 12.5 |
| 2-hydroxyethyl methacrylate | 42 | 42 | 12.5 | 12.5 |
| paraffin wax | 0.3 | 0.3 | 0.3 | 0.3 |
| N B R | 16 | 16 | 0 | 0 |
| 1,2-polybutadiene | 0 | 0 | 75 | 75 |
| tetramethyl thiourea | 6 | 0 | 0 | 0 |
| organic vanadium salt* | 0 | 5 | 0 | 0 |
| cobalt naphthenate | 0 | 0 | 5 | 3 |
| dimethyl paratoluidine | 0 | 0 | 0 | 1 |

*Hardening accelerator manufactured by Nippon Yushi K.K.

Table 3

| Test No. | Composition A | Composition B | Bond Strength Tensile strength (Kg/cm$^2$) | Bond Strength Impact strength (Kg.cm/cm$^2$) | Bond Strength Peel strength (Kg/25mm) | Set time |
| --- | --- | --- | --- | --- | --- | --- |
| 11 | A-1 | B-3 | 264 | 19 | 11 | 6 min. 30 sec. |
| 12 | A-1 | B-4 | 237 | 21 | 11 | 12 min. |
| 13 | A-1 | B-5 | 128 | 13 | 7 | 120 min. |
| 14 | A-1 | B-6 | 230 | 12 | 5 | 4 min. |
| 15 Reference | A-2 | B-3 | 253 | 20 | 12 | 10 min. 30 sec. |
| 16 Reference | A-2 | B-4 | 230 | 22 | 11 | 10 min. |
| 17 Reference | A-2 | B-5 | 92 | 10.5 | 6 | 180 hrs. |
| 18 Reference | A-2 | B-6 | 234 | 11 | 2 | 20 min. |

EXAMPLE 3

Anaerobic adhesive compositions were respectively prepared by using the components shown in Table 4. The storage stability and the set time of the adhesive composition were measured. The results are shown in Table 4.

The composition of the invention in Test No. 19 had the same storage stability but had shorter set time (faster hardening rate) in comparison with the composition in Test No. 20.

The composition in Test No. 20 had bad smell though the composition in Test No. 19 had not such smell.

Table 4

| Test No. | 19 | 20 |
| --- | --- | --- |
| Composition: | | |
| Tetraethyleneglycol dimethacrylate | 100 | 100 |
| Diisopropylbenzene dihydroperoxide | 2 | 2 |
| Cumene hydroperoxide | 0 | 3 |
| Dimethyl-p-toluidine | 1 | 1 |
| Test: | | |
| Storage stability (min.) | 15 | 15 |
| Set time:    (min.) | | |
| steel/steel | 25 | 30 |
| stainless steel/stainless steel | 30 | 40 |

EXAMPLE 4

The storage tests for the compositions A (A-1, A-2 and A-6) used in Example 1 were carried out. The results are shown in Table 5.

Table 5

| Composition A | Storage stability (min.) |
| --- | --- |
| A-1 (invention) | 180 |
| A-2 (reference) | 120 |
| A-6 (reference) | 15 |

EXAMPLE 5

The primary skin irritation tests for rabbit (White Japanese: male) were carried out.

The hair on the back of the rabbit was cut off and about 30 mg of the ingredient (peroxide) being absrobed on disc filter paper having a diameter of 6 mm was contacted with the skin and polyethylene film having a diameter of 12 mm and an adhesive tape having a diameter of 30 mm was superposed to set. After 3 hours from the setting, the filter paper was removed and the condition of the skin was observed and evaluated under the standard rating shown in Table 6 by five panel members.

The skin of the rabbit was kept in the condition and observed after 6 hours and 24 hours. Three rabbits were used for the tests and the primary skin irritation were given by average of value in total of 3×5=15 points. The results are shown in Table 7.

In the tests, when a solid peroxide was used, the peroxide was dissolved in a solvent which had no skin reaction.

Table 6

| Rating: Evaluation of skin reaction | Value |
| --- | --- |
| No erythema | 0 |
| Very slight erythema (barely perceptible) | 1 |
| Well defined erythema | 2 |
| Moderate to severe erythema | 3 |
| Severe erythema | 4 |

Table 7

| Test ingredient | Primary skin irritation index No. after 3 hr. | after 6 hr. | after 24 hr. |
| --- | --- | --- | --- |
| Solvent* 100 wt. parts | 0 | 0 | 0 |
| DHP:6/solvent*:100 | 0 | 0 | 0 |
| CHP:8.8/solvent*:100 | 0.5 | 1.5 | 2.6 |
| BPO:6.0/solvent*:100 | 0.3 | 1.1 | 1.5 |

*Solvent: methoxypolyethyleneglycol monomethacrylate

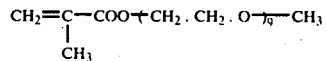

EXAMPLE 6

A 10 wt. parts of ethylenethiourea was dissolved in 100 wt. parts of mixed solvent of ethanol and acetone (50:50 by weight) to prepare a solution of a hardening accelerator. The solution was applied on one surface of the steel test piece for bonding by a brush and the solvent was vaporized and the reactive mixture shown in Table 8 was applied to bond steel/steel test pieces and the set time and the tensile strength after 1 day were measured.

In accordance with the method of Example 5, the primary skin irritation index of the mixture was measured after 1 days.

Table 8

| Reactive mixture | A | B | C | D (Ref.) |
|---|---|---|---|---|
| Components: | | | | |
| Monomethacrylpolyester[1] | 80 | 50 | 0 | 50 |
| Methyl methacrylate | 20 | 20 | 20 | 20 |
| Epoxydimethacrylate[2] | 0 | 30 | 30 | 30 |
| Triethyleneglycol dimethacrylate | 0 | 0 | 50 | 0 |
| Diisopropylbenzene dihydroperoxide | 2 | 2 | 2 | 0 |
| Cumene hydroperoxide | 0 | 0 | 0 | 3 |
| Results: | | | | |
| Set time | 5 min. | 3 min. 30 sec. | 1 min. | 6 min. |
| Tensile strength (after 1 day) (Kg/cm$^2$) | 270 | 300 | 250 | 290 |
| Primary skin irritation index (after 1 day) | 0 | 0 | 0 | 2.0 |

Note:

[1] $CH_2=C(CH_3)-C(=O)-O-CH_2-CH_2-O-C(=O)-C_6H_4-C(=O)-O-CH_2-CH(CH_3)-CH_3$

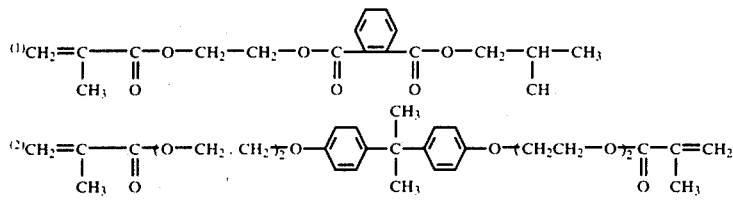

[2] $CH_2=C(CH_3)-C(=O)-O-(CH_2CH_2O)_n-C_6H_4-C(CH_3)-C_6H_4-O-(CH_2CH_2O)_n-C(=O)-C(CH_3)=CH_2$

What is claimed is:

1. A hardenable composition which consists essentially of (1) an acrylate and/or a methacrylate monomer, wherein the monomer contains more than 50 wt. % of acrylate and/or methacrylate, (2) more than 0.5 wt. part of a hardener consisting essentially of diisopropylbenzene dihydroperoxide and (3) more than 0.01 wt. part of a hardening accelerator to 100 wt. parts of total monomers.

2. A hardenable composition according to claim 1 wherein three components are stored in a form of mixture thereof.

3. A hardenable composition according to claim 1 wherein the acrylate and/or methacrylate is admixed with diisopropylbenzene dihydroperoxide and a polymerization inhibitor.

4. A hardenable composition according to claim 1 wherein the acrylate and/or methacrylate is admixed with the hardening accelerator.

5. A hardenable composition according to claim 1 wherein a paraffin wax is incorporated in the composition.

6. A hardenable composition according to claim 1 wherein an inorganic or organic powder for a viscosity control or for a modification of the hardened product is incorporated.

7. A hardenable composition according to claim 1 wherein the hardening accelerator is a reducing agent of a redox catalyst.

8. A hardenable composition comprising two components which can be separately stored prior to final admixing wherein component A comprises an acrylate and/or a methacrylate monomer and more than 0.5 wt. part of a hardener consisting essentially of diisopropylbenzene dihydroperoxide and component B comprises an acrylate and/or methacrylate monomer and more than 0.01 wt. part of a hardening accelerator to 100 wt. parts of total monomers, wherein the total monomer contains more than 50 wt. % of acrylate and/or methacrylate.

9. A hardenable composition according to claim 8, wherein component A also includes a polymerization inhibitor.

* * * * *